Feb. 20, 1962  O. K. KELLEY ETAL  3,021,727
TRIPLE TURBINE BUS AND TRUCK TRANSMISSIONS
Filed Oct. 13, 1958  3 Sheets-Sheet 1

INVENTORS
Oliver K. Kelley &
Gilbert K. Hause
BY
W. C. Middleton
ATTORNEY

INVENTOR
Oliver K. Kelley &
Gilbert K. Hause
BY W.C. Middleton
ATTORNEY

Feb. 20, 1962     O. K. KELLEY ETAL     3,021,727
TRIPLE TURBINE BUS AND TRUCK TRANSMISSIONS
Filed Oct. 13, 1958     3 Sheets-Sheet 3

INVENTOR
Oliver K. Kelley &
Gilbert K. House
BY
W. C. Middleton
ATTORNEY

United States Patent Office 3,021,727
Patented Feb. 20, 1962

3,021,727
TRIPLE TURBINE BUS AND TRUCK TRANSMISSIONS
Oliver K. Kelley and Gilbert K. Hause, Bloomfield Hills, Mich., assignors to General Motors Corporation, Detroit, Mich., a corporation of Delaware
Filed Oct. 13, 1958, Ser. No. 766,781
19 Claims. (Cl. 74—677)

This invention relates to transmissions for motor vehicles and more particularly to an improved transmission of the type incorporating a plural turbine hydrodynamic torque converter and planetary gearing system driven by the torque converter.

An object of this invention is to provide a hydrodynamic torque converter and gearing combination wherein the turbines of the torque converter successively receive working fluid from the impeller and transmit torque to an output shaft through drive connections having successively decreasing speed ratios.

Another object of this invention is to provide a transmission of the class described including a lock up clutch which may be engaged to provide a direct drive connection from the input shaft to the output shaft to reduce transmission losses when operating in direct drive.

A further object of this invention is to provide a transmission of the type described wherein a brake may be applied to one element of the gear unit to prevent rotation of one element of the gear unit and a turbine of the converter to provide reverse drive.

An additional object of this invention is to provide in a transmission of the type described an engageable and releasable brake whereby the torque multiplying effect of the gear unit may be rendered ineffective to provide a practical effective neutral condition of operation although one turbine of the converter is directly connected to the output shaft.

A further object of this invention is to provide in a transmission of the class described, an engageable and releasable brake effective when released to render both the gear unit and the torque converter ineffective to multiply torque although a drive connection is maintained between a converter turbine and the output shaft.

These and other objects of the invention will be apparent from the following description and claims taken in conjunction with the accompanying drawings in which:

Figure 1:
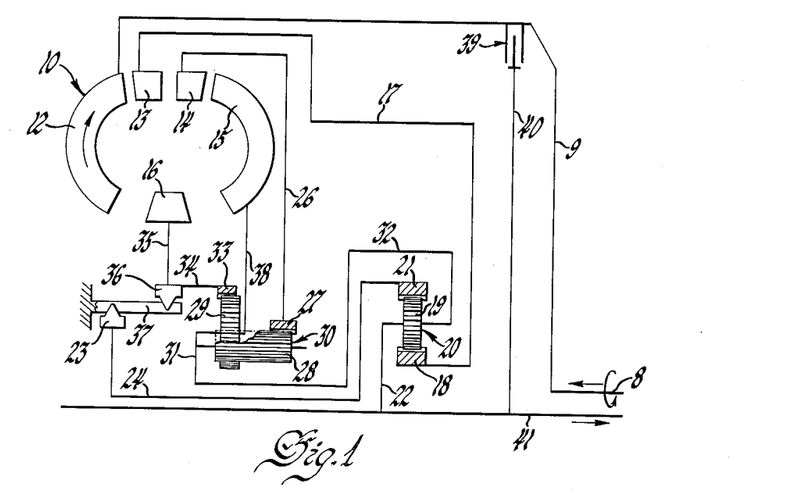
FIGURE 1 is a schematic diagram of one form of the invention.

Referring to FIGURE 1, there is shown an arrangement of a plural turbine, planetary gearing combination constructed in accordance with the principles of this invention wherein an engine driven shaft 8 is mechanically connected to drive an impeller 12 of a hydrodynamic torque converter unit generally designated at 10. Converter 10 is provided with bladed turbines 13, 14 and 15 and a bladed reaction member 16. Turbine 13 is connected by a drive connection 17 to a sun gear 18 of a planetary gearing unit generally designated at 20, which includes a planetary gear 19 supported in a planet carrier 22 and in mesh with sun gear 18 and a ring gear 21. Carrier 22 is fixed to a power delivery shaft 41 for rotation therewith. A one-way brake 23 cooperates with a ground member 37 to prevent reverse rotation of ring gear 21 with respect to the direction of rotation of impeller 12 and to permit free forward rotation of ring gear 21 in the direction of rotation of impeller 12. One-way brake member 23 is connected to ring gear 21 by a suitable connection 24.

Turbine 14 is connected to a ring gear 27 of a second planetary gearing unit indicated generally at 30 by a suitable drive connection 26. Gear unit 30 includes a pair of intermeshing pinion gears 28 and 29 both supported in a planet carrier 31, the pinion gear 29 being of greater diameter than pinion 28. Pinion gear 28 meshes with ring gear 27 and pinion gear 29. Pinion gear 29 meshes with a ring gear 33 and gear 28. Planet carrier 31 is connected for rotation with carrier 22 by a drive connection 32 and is connected directly to turbine 15 by a drive connection 38. The turbine 15, carrier 31, carrier 22 and power delivery shaft 41 are therefore all connected directly to each other for rotation at the same speed as a unit. Ring gear 33 and bladed reaction member 16 are connected to each other through a one-way brake 36 which cooperates with ground member 37 to prevent reverse rotation of the ring gear 33 and reaction member 16, but may permit forward rotation of these members. Ring gear 33 is connected to member 36 through a connection 34 and bladed reaction member 16 is connected to member 36 through a connection 35.

In operation, the hydrodynamic torque converter unit 10 is filled with working fluid such as oil and rotation of impeller 12 causes the impeller to deliver fluid to turbine 13 tending to rotate the same. Turbine 13 discharges fluid into turbine 14 and turbine 14 into turbine 15. The blades of reaction member 16 receive fluid from turbine 15 and redirect the fluid into impeller 12 at an angle such that the fluid tends to drive the impeller in the same direction of rotation as does shaft 8. The relative amount of energy extracted from the circulating fluid by the individual turbines depends upon their relative speeds of rotation. It will be noted that impeller 12 and turbine 15 constitute radial flow members while turbines 13 and 14 and reaction member 16 constitute axial flow members. Due to the position of the turbines in the circulating fluid flow path the relative amount of torque transmitted by the various turbines will vary as the speed of rotation of the turbines varies. At initial start, turbine 13 is the primary torque transmitting member while the other turbines 14 and 15 each extract less energy than its preceding turbine. As turbines 14 and 15 pick up speed of rotation, they transmit increasing torque while that transmitted by turbine 13 drops off. At high speed of rotation, when the speed of rotation of turbine 15 approaches that of impeller 12, turbine 15 may transmit all of the energy while turbines 13 and 14 freely spin. The transition of drive between the various turbines is extremely smooth and gradual with overlap as one turbine picks up increasing percentages of the load and another drops the percentage of load carried by it.

In the description of the FIGURE 1 embodiment of the invention, reference is made to planet carriers 22 and 31 as being separate carriers. For simplicity of manufacture, the parts are made in separate pieces which are rigidly joined together in the assembly, for example by means of splines. In function, the parts 22, 31 and 32 constitute a single carrier having the pinion gears 19, 28 and 29 journalled therein.

FIGURE 1 operation

Assuming the vehicle is standing still with the engine running, impeller 12 will be driven in a counterclockwise direction. Due to the vehicle load on shaft 41, impeller 12 will be unable to impart sufficient energy to the working fluid to drive the vehicle at engine idle speeds. As the impeller is speeded up, circulating working fluid tends to rotate turbines 13, 14 and 15 counterclockwise and due to the angularity of the blades of reaction member 16 tends to rotate reaction member 16 clockwise. One-way brake 36 prevents such rotation of member 16 but may permit counterclockwise rotation of member 16.

Upon increase in speed of rotation of impeller 12, the power delivery shaft 41 will initially be rotated primarily through action of turbine 13 which drives sun gear 18 in a counterclockwise or forward direction. Due to the vehicle load applied to carrier 22, ring gear 21 tends to rotate clockwise but is prevented from so spinning by one-way brake 23. Pinion gear 19 therefore walks around ring gear 21, driving the carrier 22, shaft 41, carrier 31 and turbine 15 in a counterclockwise or forward direction in reduction drive at a speed determined by the drive ratio of gear unit 20 and the speed of rotation of turbine 13. Circulating working fluid in converter 10 simultaneously tends to drive turbines 14 and 15 in a counterclockwise direction. Ring gear 27 is driven in a counterclockwise rotation by turbine 14 thereby imparting a counterclockwise rotation to pinion gear 28. Pinion gear 29 rotates clockwise tending to spin ring gear 33 clockwise. With one-way brake 36 holding ring gear 33 stationary, pinion gear 29 walks around ring gear 33 driving carrier 31 in a counterclockwise or forward direction. A third torque component in a forward direction is applied to carrier 31 by turbine 15 directly connected to the carrier 31.

At start, all three turbines impart drive torque to shaft 41, the turbine 13 being the primary driving element. As turbines 14 and 15 increase in speed of rotation, the proportion of energy extracted from the working fluid by these turbines increases while that extracted by turbine 13 decreases. At some speed of rotation, turbine 13 will no longer transmit power but will tend to rotate freely. One-way brake 23 permits free rotation of turbine 13 and ring gear 21 when turbines 14 and 15 constitute the power delivery members of the converter. One-way brake 36 permits ring gear 33 and reaction member 16 to rotate freely forwardly when turbine 15 constitutes the sole output member of the converter. When turbine 15 is rotating at a speed sufficient to constitute the sole driving member, shaft 41 is driven directly without torque multiplication in either gear unit or the converter. Direct drive clutch 39 may be engaged by suitable controls, not shown, to connect shaft 9 directly to shaft 41 through a drive connection 40 fixed for rotation with shaft 41 to avoid the slip loss of the converter unit when operating in direct drive.

In the FIGURE 1 embodiment, the drive connections from the turbines 13, 14 and 15 are in effect concentric one within the other while the drive connection 9 from shaft 8 to impeller 12 encloses all three drive connections 17, 26 and 38. The gear units and direct drive clutch are positioned on the side of the converter adjacent engine driven shaft 8.

Figure 2:
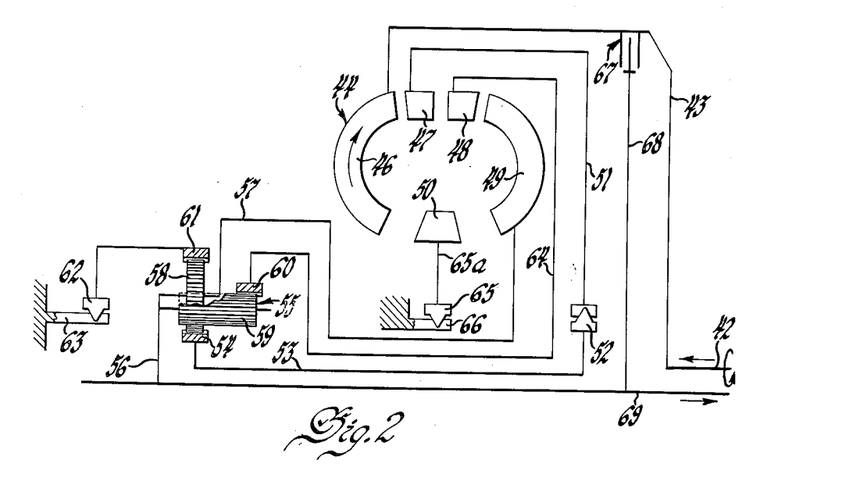
FIGURE 2 is a schematic diagram of a second form of the invention having a more simplified gear train than that illustrated in FIGURE 1.

In FIGURE 2, there is shown a modified and somewhat simpler form of the invention wherein a single gear unit 55 is positioned adjacent the torque converter 44 at the rear of the torque converter rather than at the front as in FIGURE 1. An engine driven power input shaft 42 is connected to an impeller 46 by means of a drive connection 43. Converter 44 contains turbines 47, 48 and 49 and a reaction member 50. The relationship of the torque converter elements in the fluid path are the same as in FIGURE 1. Turbine 47 drives a sun gear 54 of gear unit 55 by way of drive connections 51 and 53, there being a one-way clutch 52 between drive connections 51 and 53. Gear unit 55 is provided with a planet carrier 56 fixed to output shaft 69 and connected to turbine 49 through a drive connection 57. Carrier 56 supports pinions 58 and 59 in mesh with each other. The relatively large diameter pinion 58 also meshes with sun gear 54 and a ring gear 61. The relatively small diameter pinion 59 also meshes with a ring gear 60. A one-way brake 62 cooperates with a ground member 63 to prevent reverse rotation of reaction ring gear 61 and to permit free forward rotation of gear 61. A drive connection 64 connects turbine 48 to ring gear 60. Reaction member 50 is connected to a one-way brake element 65 by member 65a, the one-way brake 65 cooperating with a ground member 66 to prevent reverse rotation of bladed reaction member 50 and to permit free forward rotation of member 50. A clutch 67 may be engaged to lock shaft 42 to shaft 69 through a drive member 68 fixed for rotation with shaft 69.

The operation of the FIGURE 2 embodiment is the same as that of FIGURE 1 in that initial drive is through the first turbine 47. In the FIGURE 2 version however, a one-way clutch 52 is interposed in the drive connection between turbine 47 and the sun gear 54 driven by the first turbine. Assuming the impeller 44 is rotated counterclockwise by shaft 12 at a sufficient speed to place the vehicle in motion, turbine 47 will rotate sun gear 54 in a counterclockwise or forward direction. Pinion gear 58 rotates clockwise and tends to rotate ring gear 61 clockwise. Such rotation of ring gear 61 is prevented by one-way brake 62. The pinion gear 61 therefore walks around ring gear 61 driving carrier 56 and shaft 69 in a counterclockwise or forward direction. At the same time turbine 48 is rotating ring gear 60 in a counterclockwise direction to impart a second torque input to gear unit 55. Turbine 49 imparts a third torque input in a counterclockwise direction to carrier 56.

As the speed of rotation of turbine 48 increases the load on turbine 47 drops off and the input through turbines 48 and 49 increases. At some speed of rotation when turbine 47 no longer constitutes a power input member for the gearing unit, one-way clutch 52 will release to permit sun gear 54 to spin freely. At a higher rotational speed of turbine 49 when the turbine 49 approaches the speed of rotation of impeller 46, one-way brake 62 permits free rotation of ring gear 61 and one-way brake 65 permits free rotation of bladed reaction member 50. The assembly then functions as a fluid coupling wherein the turbine is connected directly to the output shaft and drives the output shaft without torque multiplication. At the speed range wherein turbine 48 constitutes the primary driving element the effective drive ratio of gear unit 55 is different than that at initial start. For initial start the effective gear train is primarily through gear 54 and gear 58 with ring gear 61 serving as a reaction member. When turbine 48 constitutes the primary driving member the gear train includes gear 60, gear 59, gear 58 with gear 61 serving as the reaction member. Thus, when gear 54 is the primary input member, maximum torque multiplication is provided by the gear unit. When gear 60 is the primary input member a lesser torque multiplication is provided by the gear unit. When turbine 49 is the primary driving element no torque multiplication is provided by the gear unit. The drive ratios are analogous to first or low gear, second gear and high or direct drive. When turbines 47 and 48 are the primary driving elements, hydrodynamic torque multiplication occurs in the converter 44. When turbine 49 is the driving element and reactor 50 is freely rotating, the converter acts as a fluid coupling and delivers torque without torque multiplication. The transition between these various drive conditions of operation is very smooth and gradual without any torque reaction bumps.

Clutch 67 may be engaged in direct drive operation to lock shaft 42 to shaft 69 through drive connection 68 fixed to shaft 69 to cut out slip losses in the turbine.

Figure 3:
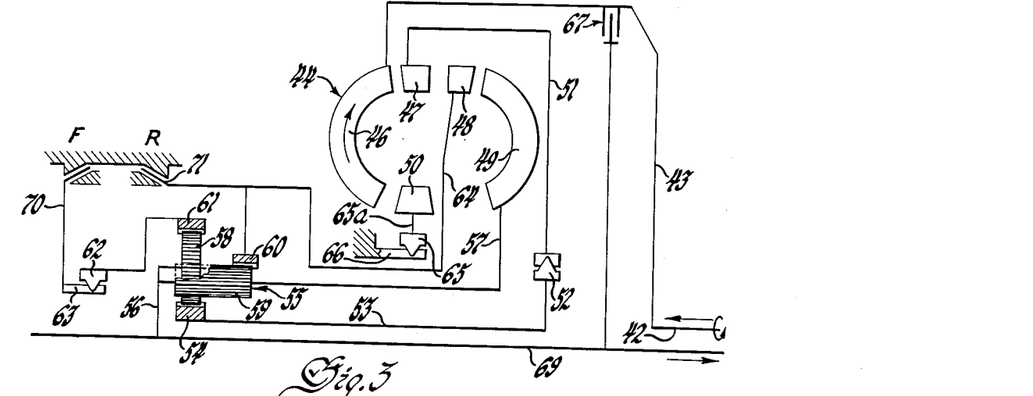
FIGURE 3 is a schematic diagram of a form of the invention similar to that of FIGURE 2 but including engageable and releasable forward and reverse brakes.

The arrangement of FIGURE 3 is similar to that of FIGURE 2 but includes the addition of a pair of brakes 70 and 71 not shown in FIGURE 2. Accordingly, similar parts appearing in FIGURES 2 and 3 are given the same numbers as those appearing in FIGURE 2. In FIGURE 3, the drive connection 64 from turbine 48 to ring gear 60 extends between turbine 49 and reaction member 50 rather than around the outside of turbine 49 as shown in FIGURE 3.

The addition of brakes 70 and 71 makes it possible to cut out the torque multiplication effect of gear unit 55 and to select reverse drive. If brake 70 is applied, the operation is the same as that of FIGURE 2 wherein drive is initially through sun gear 54 and gear 58 with gear 61 serving as a reaction member. This provides maximum torque multiplication in gear unit 55 which may be termed first speed. With increased speed of rotation, turbine 48 becomes effective to drive ring gear 60 for second speed drive ratio through the gear unit. Finally, when turbine 49 approaches the speed of rotation of impeller 46, drive is direct. If the brakes 70 and 71 are released, the gear train is rendered ineffective to multiply torque since one-way brake 62 cannot hold ring gear 61 against rotation. Considering the vehicle at start condition, carrier 56 is standing still due to the load of the vehicle on the carrier. With brake 70 released, counterclockwise rotation of sun gear 54 causes clockwise rotation of pinion gear 58 which carries ring gear 61 in a clockwise rotation. The gear 58 freely spins. Assuming that turbine 48 is delivering torque to ring gear 60, gear 60 rotates counterclockwise causing counterclockwise rotation of gear 59 and clockwise rotation of gears 58 and 61. Since gear 61 serves as the reaction member for power input to the gear unit from either sun gear 54 or ring gear 60, the gear unit is unable to multiply torque when brakes 70 and 71 are released. The torque applied to shaft 69 by way of turbine 49 is normally not sufficient to overcome the load applied to shaft 69 by the weight of the vehicle so that a practical although not a positive neutral condition of operation exists. It will be noted in the FIGURE 3 embodiment that the torque converter 44 still functions as a torque converter so that turbine 49 is driven at the torque multiplication of the converter unit. The output shaft 69 is also driven at the torque multiplication of the converter unit, but without any torque multiplication through the gearing. A higher speed of rotation of impeller 46 will be required to drive the vehicle when brake 70 is released than is the case when brake 70 is engaged.

To obtain reverse drive of the vehicle, forward brake 70 is released and brake 71 engaged to hold ring gear 60 and turbine 48 against rotation. Assuming a counterclockwise direction of rotation of impeller 46 and turbine 47, sun gear 54 will be rotated in a counterclockwise or forward direction thereby causing clockwise rotation of pinion gear 58. Ring gear 61 will spin freely. Pinion gear 59 will be rotated in a clockwise direction and since ring gear 60 is fixed against rotation, gear 59 will walk around ring gear 60 in a clockwise direction driving carrier 56 in a clockwise or reverse direction. Torque multiplication is obtained in the converter as well as the gear unit. Since turbine 48 is held against rotation by brake 71, the blades of turbine 48 redirect the fluid delivered by turbine 47 so that the fluid strikes turbine 49 in such a direction that the circulating working fluid drives the turbine 49 in a clockwise or reverse direction rather than in a counterclockwise or forward direction as it does when brake 71 is released. The member 48 functions as a reaction member rather than a turbine when brake 71 is applied. In reverse drive therefore, turbine 47 drives carrier 56 in reverse through the torque multiplication of the gear train 54, 58, 59, 60 while turbine 49 drives carrier 56 in reverse at a torque multiplication of the torque converter. Due to the change in discharge angle of fluid leaving turbine 49 when operating in reverse, the circulating fluid may cause reaction member 50 to freewheel when operating in reverse.

When operating in forward drive, lock up clutch 67 may be applied to directly connect shaft 42 to shaft 69.

Figure 4:
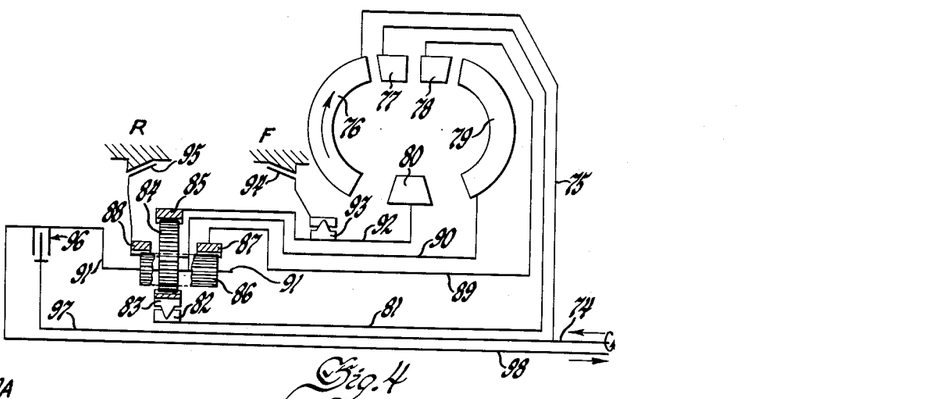
FIGURE 4 is a schematic diagram of an additional form of the invention wherein the direct drive clutch is positioned to the rear of the gear unit and wherein both the converter and gear unit are rendered incapable of multiplying torque when the forward brake is released.

In the FIGURE 4 embodiment of the invention, a more effective neutral condition of operation may be had than that provided by the FIGURE 3 embodiment. Also in the FIGURE 4 arrangement, the direct drive lock up clutch is positioned to the rear of the converter unit and adjacent the gearing unit. An engine driven shaft 74 drives a converter impeller 76 through a drive connection 75. The converter includes turbines 77, 78, 79 and a reaction member 80 which together with impeller 76 complete the fluid circuit. A planetary gearing unit comprises a planet carrier 91 which supports a large diameter pinion gear 84 in mesh with a relatively small diameter pinion gear 86, a sun gear 83 in mesh with gear 84, a ring gear 85 in mesh with gear 84, and a pair of ring gears 87 and 88 in mesh with pinion gear 86. Turbine 77 is connected to sun gear 83 through a drive connection 81 and a one-way clutch 82. Turbine 78 is connected to ring gear 87 through a drive connection 89. Turbine 79 is connected to planet carrier 91 through a drive connection 90. Planet carrier 91 is fixed to output shaft 98. Bladed reaction member 80 is connected to ring gear 85 by a connection 92. A one-way brake 93 and a brake 94 cooperate to prevent reverse rotation of reaction member 80 and ring gear 85 when brake 94 is engaged. A brake 95 may be engaged to prevent rotation of ring gear 88. A direct drive clutch 96 may be engaged to directly connect engine shaft 74 to output shaft 98 by way of an extension 97 of engine driven shaft 74.

In normal forward operation, the forward brake 94 will be applied and reverse brake 95 released. Under start conditions one-way brake 93 is effective to prevent reverse rotation of reaction member 80 and ring gear 85. Assuming counterclockwise rotation of engine driven shaft 74 and impeller 76, turbine 77 will rotate counterclockwise to drive sun gear 83 counterclockwise through one-way clutch 82. Pinion gear 84 rotates in a clockwise direction and due to the load of the vehicle on carrier 91, ring gear 85 tends to spin in a clockwise direction. Brakes 93 and 94 cooperate to prevent clockwise or reverse rotation of ring gear 85 and turbine 80. Pinion gear 84 therefore walks around ring gear 85 driving carrier 91 in a counterclockwise or forward direction. Gear 86 in mesh with gear 84 is rotating in a counterclockwise direction. Turbine 78 adds a second torque input by driving ring gear 87 counterclockwise. Turbine 79 adds a third torque input by driving carrier 91 counterclockwise. As the speed of rotation of turbines 78 and 79 increases, these turbines will gradually take on the load while that carried by turbine 77 drops off. When turbine 77 no longer delivers torque, one-way clutch 82 will permit free spinning rotation of sun gear 83. When all of the load is carried by turbine 79, one-way brake 93 will permit free forward rotation of reaction member 80 and ring gear 85.

When brakes 94 and 95 are both released, a more effective neutral is obtained than that provided by the FIGURE 3 arrangement. In the FIGURE 3 arrangement, the gear unit was rendered incapable of torque multiplication in neutral, but the converter was still effective to multiply torque. In the FIGURE 4 embodiment, neither the gear unit nor the converter are effective to multiply torque in neutral. Release of brake 94 permits free reverse rotation of reaction member 80 and ring gear 85. There is therefore no effective reaction member for either the gear unit or the converter with the result that neither can multiply torque. A very high speed of rotation of impeller 76 is therefore required to impart sufficient energy to turbine 79 to overcome the vehicle load on carrier 91. The neutral condition of operation provided by the FIGURE 4 embodiment, while not positive, is as a practical matter entirely satisfactory and practical.

Application of reverse brake 95 and release of forward brake 95 prevents rotation of ring gears 88 and 87. Considering sun gear 83 as being driven counterclockwise, pinion gear 84 will rotate clockwise and pinion gear 86 will rotate counterclockwise. With gear 88 serving as a reaction member, pinion gear 86 will walk around ring gear 88 driving carrier 91 in a clockwise or reverse direction. Circulating working fluid in the converter will tend to rotate turbine 78 and ring gear 87 counterclockwise. However, due to the fact that ring gear 87 in mesh with pinion gear 86 has the same number of teeth as ring gear 88 in mesh with pinion gear 86, the ring gear 87 is physically unable to rotate when ring gear 88 is held against rotation by brake 95. The application of brake 95 to ring gear 88 not only prevents rotation of ring gear 88 but also prevents rotation of ring gear 87 and turbine 78. When operating in reverse, member 78 acts as a fixed reaction member rather than as a turbine and redirects the circulating working fluid in the converter such that the fluid tends to drive turbine 79 clockwise or in reverse rather than forward.

Figure 5:
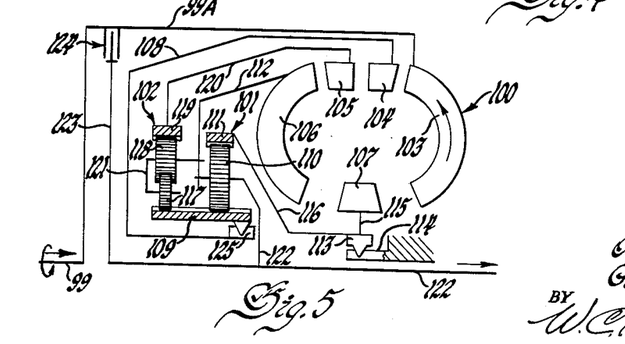
FIGURE 5 is a schematic diagram of a converter and gearing combination wherein the compound gear unit includes a single sun gear for driving a pair of pinion gears supported in a common carrier.

In the FIGURE 5 embodiment, a pair of planetary gearing units 101 and 102 and a direct drive clutch are located in front of the torque converter 100. Converter 100 includes impeller 103, turbines 104, 105, 106 and a bladed reaction member 107. A drive connection 108 connects turbine 104 to a sun gear 109 common to the two gear units. Gear unit 101 includes a pinion gear 110 supported in a planet carrier 121 fixed for rotation with output shaft 122, the gear 110 being in mesh with sun gear 109 and a ring gear 111. Carrier 121 is connected to turbine 106 by a drive connection 112. A one-way brake 113 cooperates with a ground member 114 to prevent reverse rotation of reaction member 107 and ring gear 111 and to permit free forward rotation of these elements, the one-way brake being connected to turbine 107 by a connection 115 and to ring gear 111 by a connection 116. Planet carrier 121 supports a pair of planet pinions 117 and 118 in mesh with each other, the pinion gear 117 being in mesh with sun gear 109 and the pinion gear 118 being in mesh with a ring gear 119. Turbine 105 is connected to ring gear 119 by a drive connection 120. Impeller 103 is driven by an engine driven shaft 99 through a drive connection 99A. A lock up clutch 124 may be engaged to provide direct drive of power delivery shaft 122 through a drive member 123 fixed for rotation with shaft 122. A one-way clutch 125 is interposed between drive connection 108 and sun gear 109.

Assuming the engine driven shaft 99 as rotating in a clockwise direction as indicated by the arrow in FIGURE 5, impeller 103 will rotate clockwise and the circulating working fluid in the converter will tend to rotate turbines 104, 105 and 106 clockwise in the direction of rotation of impeller 103. Due to the angularity of the blades of reaction member 107, the reaction member will tend to rotate counterclockwise or in the reverse direction to the direction of rotation of impeller 103. One-way brake 113 will prevent such reverse rotation of reaction member 107.

At start, turbine 104 will be the primary driving element and will rotate clockwise to drive sun gear 109 clockwise in the same direction of rotation as impeller 100. Due to the load of the vehicle on carrier 121, pinion gear 110 will rotate counterclockwise tending to spin ring gear 111 counterclockwise. One-way brake 113 locks up to prevent this reverse rotation of ring gear 111 and reaction member 107. Pinion gear 110 therefore walks around ring gear 111 driving the carrier 121 in a clockwise or forward direction. At the same time, circulating working fluid in the converter is tending to rotate turbines 105 and 106 in a clockwise or forward direction. Gear unit 102 therefore has a power input both from sun gear 109 and ring gear 119. Clockwise rotation of sun gear 109 imparts counterclockwise rotation to pinion gear 117 which in turn imparts clockwise rotation to pinion gear 119. If pinion gear 119 were considered to be a fixed reaction member, gear 118 would walk around gear 119 to impart a clockwise or forward rotation to carrier 121. At initial start, the turbine 105 rotates forwardly at a slow rate of speed, but as the speed of rotation increases, turbine 105 gradually picks up the load until all of the load is transmitted by turbines 105 and 106. When turbine 104 is no longer effective to drive sun gear 109, one-way clutch 125 will permit sun gear 109 to freely rotate. Input to the gearing is then through gear 119 and carrier 112. When turbine 106 assumes the full load, ring gear 111 and reactor 107 are permitted to freewheel by clutch 113.

Figures 6, 7:
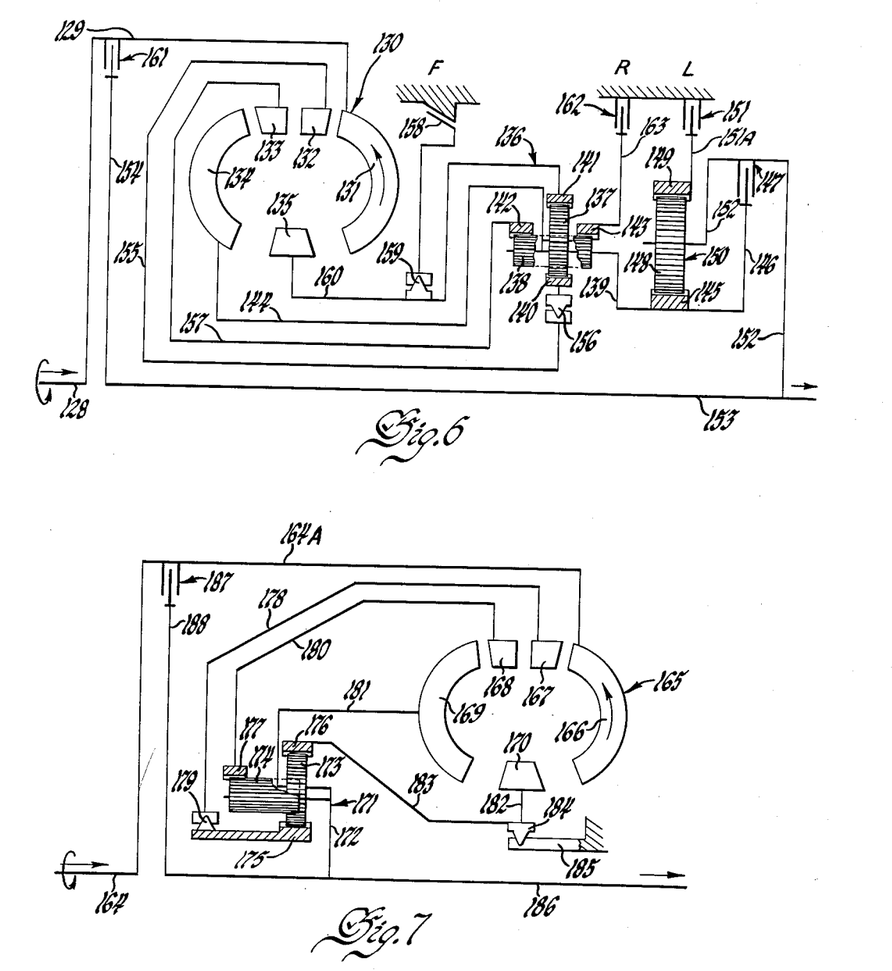
FIGURE 6 is a schematic diagram of a converter combined with a pair of gear units and including clutch and brake means associated with one of the pair of gear units simultaneously releasable to provide a positive neutral condition of operation and selectively engageable to provide direct drive of the output shaft by one of the gear units or to provide drive of the output shaft in reduction drive through both gear units.
FIGURE 7 is a schematic diagram of an additional form of the invention similar to FIGURE 3 but having the gear unit reaction ring gear and converter reaction member grounded by a single one-way brake.

The FIGURE 6 embodiment is similar to that of FIGURE 4 with the exception of the location of the direct drive lock up clutch and the addition of an additional two speed gear unit and provision for a positive neutral condition of operation. A torque converter 130 includes an impeller 131, turbines 132, 133 and 134 and a reaction member 135. Impeller 131 is driven by an engine driven shaft 128 through a drive connection 129. A first planetary gearing unit 136 includes a pair of pinion gears 137 and 138 supported in a planet carrier 139 and in mesh with each other. Large diameter pinion 137 meshes with a sun gear 140 and a ring gear 141. Small diameter pinion 138 meshes with a pair of ring gears 142 and 143 as well as pinion gear 137. Planet carrier 139 is connected to turbine 134 by a drive connection 144 and to a sun gear 145 of a second gear unit 150 by an extension 146. An engageable and releasable clutch 147 may connect or disconnect planet carrier 139 to or from a planet carrier 152 of gear unit 150. Turbine 132 is connected to sun gear 140 of gear unit 136 through a drive connection 155 and a one-way clutch 156. Turbine 133 is connected to ring gear 142 by a drive connection 157. Means for preventing reverse rotation of reaction member 135 and ring gear 142 includes an engageable and releasable brake 158 and a one-way brake 159. Reaction member 135 is connected to reaction ring gear 141 of gear unit 136 by a suitable connection 160. When forward drive brake 158 is applied, one-way brake 159 prevents reverse rotation of connection 160 but may permit members 135 and 141 to rotate freely forwardly. A reverse brake 162 may be applied to a connection 163 to prevent rotation of ring gears 143 and 142 of gear unit 136. A low brake 151 may be applied to a connection 151A to prevent rotation of ring gear 149.

Assuming that brakes 158, 151 and clutches 147 and 161 are released, no drive can be transmitted to carrier 152 and output shaft 153 to which carrier 152 is affixed. This condition may be termed a positive neutral or no drive condition of operation.

For maximum torque application to output shaft 153 as for starting the vehicle under heavy loading conditions, brakes 158 and 151 are applied. Brake 158 and one-way brake 159 cooperate to prevent reverse rotation of reaction member 135 and reaction ring gear 141 of gear unit 136. Brake 151 prevents rotation of ring gear 149. At start, considering engine shaft 128 as being rotated clockwise in the direction of the arrow turbine 132 will initially rotate in a clockwise or forward direction. Turbines 133 and 134 will also tend to rotate clockwise. Due to the load of the vehicle on carrier 152 and carrier 139, clockwise rotation of sun gear 140 by turbine 132 will cause counterclockwise rotation of pinion gear 137 such that ring gear 141 will tend to travel in a counterclockwise or reverse direction of rotation. One-way brake 159 prevents reverse rotation of ring gear 141 such that pinion gear 137 walks around ring gear 141 in a clockwise or forward direction. Planet carrier 139 rotates clockwise in reduction drive ratio of gear unit 136, driving sun gear 145 of gear until 150 clockwise. Pinion gear 148 rotates counterclockwise tending to cause ring gear 149 to spin counterclockwise. With brake 151 applied to hold ring gear 149 stationary, pinion gear 148 walks around ring gear 149 to drive planet carrier 152 clockwise in reduction of gear unit 149. Output shaft 153 is therefore driven at the torque multiplication of the converter 130 and the two gear units 136 and 150. At the same time, torque components are being applied to gear unit 136 by turbine 133 through ring gear 142 and turbine 134 through its direct connection to carrier 139.

As the vehicle speeds up, turbines 133 and 134 carry increasing proportions of the load while that applied through turbine 132 drops off. At some speed of rotation, one-way clutch 156 will release to permit sun gear 140 to freewheel. At this time all of the load is being carried by turbines 133 and 134. With further increase in speed of rotation when turbine 134 is effective to carry the entire load, one-way brake 159 will permit reaction member 135 and ring gear 141 to rotate freely. Under the conditions of operation stated, carrier 139 will be driven directly without torque multiplication, while carrier 152 and shaft 153 will then be driven in reduction drive of gear unit 150. Clutch 147 may then be engaged and brake 151 released to provide a direct connection from carrier 139 to carrier 152. Gear unit 150 will thereupon be in effect cut out of the drive train. In the event that a direct drive connection from shaft 128 to shaft 153 is desired, clutch 161 may then be engaged. A direct drive clutch 161 may be engaged to connect shaft 128 directly to shaft 153 through a connection 154.

It will of course be understood that the vehicle may be started from a standstill with brake 158 engaged and clutch 147 engaged if maximum torque is not required. In this event, the operation is the same as that when brakes 158 and 151 are applied except that the gear unit 150 is not effective to multiply torque. Carrier 152 will be driven at the torque multiplication of converter 130 and gear unit 136 since carrier 152 is directly connected to carrier 139 when clutch 147 is applied.

For reverse operation, brake 158 is released and brake 162 applied to hold ring gears 143 and 142 against rotation. If brake 151 is released and clutch 147 engaged the carriers 139 and 152 will be driven in reverse in exactly the same manner as the reverse drive obtained by the FIGURE 4 structure. If clutch 147 is released and brake 151 engaged, carrier 152 will be driven in reduction at a slower speed than carrier 139 depending upon the drive ratio of gear unit 150. Thus in reverse, shaft 153 may be driven through torque multiplication of converter 130, gear unit 136 and gear unit 150 or only through the torque multiplication of the converter 130 and gear unit 136 as desired.

The arrangement of FIGURE 7 is similar to that of FIGURE 4 with the exception of the change in the location of the drive connections from the turbines to the gear unit and the omission of the forward and reverse brakes of FIGURE 4.

Referring to FIGURE 7, torque converter 165 includes impeller 166, turbines 167, 168 and 169 and a reaction member 170. An engine driven drive shaft 164 is connected to impeller 166 by a drive connection 164A. A gear unit 171 includes a carrier 172 supporting a pair of planet pinions 173 and 174 in mesh with each other, a sun gear 175 and a ring gear 176 in mesh with large diameter pinion 173 and a ring gear 177 in mesh with small diameter pinion 174. Turbine 167 is connected to sun gear 175 through a drive connection 178 and a one-way clutch 179. Turbine 168 is connected to ring gear 177 through a drive connection 180. Turbine 169 is connected to carrier 172 through a drive connection 181. Reaction member 170 and ring gear 176 are connected to an element 184 of a one-way brake by connections 182 and 183. Element 184 cooperates with a ground member 185 to prevent reverse rotation of ring gear 176 and reaction member 170 and to permit forward rotation of the same. Carrier 172 is fixed to rotate with a power delivery shaft 186. A direct drive lock up clutch 187 may be applied to connect shaft 186 directly to shaft 164 through a drive connection 188 when desired.

The operation of the embodiment shown in FIGURE 7 is the same as that of FIGURE 4 when brake 94 of FIGURE 4 is applied. The parts of FIGURE 7 are rearranged from that of FIGURE 4 in that lock up clutch 187 is disposed forwardly of the gear unit rather than rearwardly of the gear unit as shown in FIGURE 4.

It will be apparent that several embodiments of the invention have been shown having certain common features. In FIGURES 1, 5 and 7, the gear units are positioned in front of the converter between the converter and engine driven shaft. In FIGURES 2, 3, 4 and 6, the gear units are positioned behind the converter on the side of the converter opposite the engine driven shaft. In FIGURES 1, 2, 3, 5, 6 and 7, the direct drive clutch is positioned in front of the converter between the converter and engine driven shaft. In FIGURE 4, the direct drive clutch is to the rear of the converter on the side opposite the converter from the engine driven shaft. In all figures, except FIGURE 3, the drive connections to and from the various elements of the converter extend outwardly from the converter and toward the engine drive shaft so that the drive connection from the engine shaft extends around the three turbine drive connections, the drive connection from the first turbine encloses the drive connections from the second and third turbines, and the drive connection from the second turbine extends around and encloses the drive connection from the third turbine. In the FIGURE 3 arrangement, the impeller drive connection encloses all three turbine drive connections, the first turbine drive connection encloses the second and third turbine drive connection and the third turbine drive connection extends around and encloses the second turbine drive connection.

The invention has been described in various forms which are intended to be explanatory and not to be taken in a limiting sense, since various changes in the parts, construction and arrangement may be effected without departing from the scope of the invention as set forth in the following claims.

We claim:

1. A torque multiplying transmission comprising in combination a driving member, a driven member, a planet carrier connected to said driven member for driving said driven member, first and second pinion gears journalled on the carrier in mesh with each other, a sun gear and a reaction ring gear in mesh with said first pinion gear, means for permitting forward rotation of said reaction ring gear and for preventing reverse rotation thereof, a second ring gear in mesh with said second pinion gear, means for transmitting torque from said driving member to said sun gear, additional means for transmitting torque from said driving member to said second-mentioned ring gear, and additional means for transmitting torque from said driving member to said planet carrier.

2. A torque multiplying transmission comprising in combination a driving member, a driven member, a planet carrier connected to said driven member for driving said driven member, first and second pinion gears journalled on the carrier in mesh with each other, a sun gear and a reaction ring gear in mesh with said first pinion gear, one-way brake means for permitting forward rotation of said reaction ring gear and for preventing reverse rotation thereof, a second ring gear in mesh with said second pinion gear, means including a one-way clutch for transmitting torque from said driving member to said sun gear, additional means for transmitting torque from said driving member to said second-mentioned ring gear, additional means for transmitting torque from said driving member to said planet carrier, and an engageable and releasable clutch for connecting said driving member to said driven member independently of said gearing and said carrier.

3. A power transmission comprising in combination a hydrodynamic torque converter and planetary gearing system, said torque converter including an engine driven impeller, first, second and third turbines and a reaction member, said gearing system including a planet carrier connected to a power delivery shaft for driving said power delivery shaft and supporting first and second pinion gears in mesh with each other, a reaction ring gear and a sun gear in mesh with said first pinion gear, a second ring gear in mesh with said second pinion gear, means including a one-way clutch forming a drive connection from said first turbine to said sun gear, a one-way brake for preventing rotation of said first-mentioned reaction ring gear, a drive connection from said second turbine to said second-mentioned ring gear, and a drive connection from said third turbine to said planet carrier.

4. A hydrodynamic transmission comprising in combination, an impeller for circulating working fluid, an output shaft, a first turbine adapted to transmit torque to the output shaft at a relatively high mechanical advantage through a one-way clutch to an input sun gear which drives a pinion gear which walks around a reaction ring gear, a planet carrier connected to said power output shaft for driving said output shaft and supporting said first-mentioned planet pinion in mesh with a second planet pinion, a second ring gear in mesh with said second planet pinion, a second turbine connected to said second ring gear and effective to drive said planet carrier at a lower mechanical advantage than that of the first turbine, and a third turbine connected to drive the carrier at a still lower mechanical advantage.

5. A hydrodynamic transmission comprising in combination, an impeller for circulating working fluid, an output shaft, a first axial flow turbine adapted to transmit torque to an output shaft at a relatively high mechanical advantage through a one-way clutch to an input sun gear which drives a planetary pinion gear which walks around a reaction ring gear one-way braked to ground, a carrier connected to said output shaft supporting said first pinion gear in mesh with a second pinion gear for driving the output shaft, a second ring gear in mesh with said second pinion gear, a second axial flow turbine connected to drive said second ring gear and adapted to drive said carrier at a lower mechanical advantage than the first turbine, and a radial inflow type turbine connected to drive the carrier at a still lower mechanical advantage.

6. A power transmission comprising in combination a hydrodynamic torque converter and a planetary gearing system, said torque converter including an engine driven impeller, first, second and third turbines and a reaction member, said gearing system including a planet carrier connected to a power delivery shaft for driving said power delivery shaft and supporting first and second pinion gears in mesh with each other, a reaction ring gear and a sun gear in mesh with first pinion gear, a second ring gear in mesh with said second pinion gear, means forming a drive mesh with said second pinion gear, means forming a drive connection from said first turbine to said sun gear, means preventing reverse rotation of said reaction ring gear, a drive connection from said second turbine to said second-mentioned ring gear, and a drive connection from said third turbine to said carrier, said second turbine being effective to drive said carrier at a lower mechanical advantage than the first turbine and said third turbine being effective to drive said carrier at a lower mechanical advantage than that of either said first or second turbines.

7. In a power transmission in combination, a hydrodynamic torque converter having a radial outflow impeller adapted to circulate working fluid successively through a plurality of turbines including first and second axial flow turbines and a radial flow turbine, an output shaft adapted to be driven by the radial flow turbine, the first turbine to receive fluid from the impeller providing high torque at stall and the succeeding turbines each providing torque which increases as the speed of rotation thereof approaches the speed of rotation of the impeller, first means for establishing a drive connection between said first axial flow turbine and said output shaft including a reaction ring gear, a planet carrier connected to said output shaft for driving said output shaft and supporting a planet pinion gear in mesh with said reaction ring gear and a sun gear drivingly connected to said first axial flow turbine, and second means for establishing a drive connection between said second-mentioned axial flow turbine and said output shaft, said second means including a second planet pinion gear supported in said carrier in mesh with said first planet pinion gear and a second ring gear, said second ring gear being drivingly connected to said second axial flow turbine.

8. A power transmisison comprising in combination, a hydrodynamic torque converter and a planetary gearing system, said torque converter including an engine driven impeller, first, second and third turbines and a reaction member, said gearing system including a planet carrier connected to a power delivery shaft for driving said power delivery shaft and supporting a first planet pinion in mesh with a sun gear and a reaction ring gear, means for drivingly connecting said sun gear to said first turbine, means for connecting said planet carrier to said third turbine, and means for drivingly connecting said second turbine to said carrier including a pair of intermeshing pinion gears journalled in said carrier, a reaction ring gear in mesh with one of said pair of intermeshing pinion gears and a ring gear in mesh with the other of said pair of intermeshing pinion gears and drivingly connected to said second turbine.

9. A power transmission comprising in combination, a hydrodynamic torque converter and a planetary gearing system, said torque converter including an impeller driven by an engine driven drive shaft, first, second and third turbines and a reaction member adapted to successively receive circulating working fluid from said impeller, said gearing system including a planet carrier fixed to an output shaft and to said third turbine, a pair of intermeshing pinion gears journalled in said carrier, a sun gear and a reaction ring gear in mesh with one of said pair of pinion gears, a drive connection including a one-way clutch between said first turbine and said sun gear, means for preventing reverse rotation of said ring gear and for permitting forward rotation thereof including a one-way brake and a two-way brake connected in series, a second ring gear in mesh with said second pinion gear, a drive connection between said second turbine and said second ring gear, and a selectively engageable and releasable brake effective when engaged to prevent rotation of said second turbine and said second ring gear.

10. A power transmission comprising in combination, a hydrodynamic torque converter and a planetary gearing system, said torque converter including an impeller driven by an engine drive shaft, first, second and third turbines and a reaction member adapted to successively receive circulating working fluid from said impeller, said gearing system including a planet carrier fixed to an output shaft and to said third turbine, a pair of intermeshing pinion gears journalled in said carrier, a sun gear and a ring gear in mesh with one of said pair of pinion gears, a drive connectoin including a one-way clutch between said sun gear and said first turbine, means for preventing reverse rotation of said ring gear and for permitting forward rotation thereof including an engageable and releasable two-way brake and a one-way brake connected in series, said two-way brake being effective when released to render said one-way brake inoperative and to permit reverse rotation of said ring gear, a second ring gear in mesh with the second of said pair of pinion gears, a drive connection between said second ring gear and said second turbine, an engageable and releasable brake effective when engaged to prevent rotation of said second turbine and said second ring gear to establish reverse drive of said output shaft, and an engageable and releasable lock up clutch effective when engaged to connect said drive shaft to said output shaft for direct drive of said output shaft independently of said torque converter and gearing system.

11. A power transmission comprising in combination, a hydrodynamic torque converter and a planetary gearing system, said torque converter including an impeller driven by an engine driven drive shaft, first, second and third turbines and a reaction member adapted to successively receive circulating working fluid from said impeller, said gearing system including a planet carrier fixed to an output shaft and to said third turbine, first and second planet pinions journalled in said carrier in mesh with each other, a sun gear and a reaction ring gear in mesh with said first planet pinion, one-way brake means and a two-way brake connected in series for preventing reverse rotation of said ring gear and for permitting forward rotation thereof, a drive connection between said sun gear and said first turbine, a pair of ring gears in mesh with said second planet pinion, means connecting one of said pair of ring gears to said second turbine, and an engageable and releasable brake connected to the other of said pair of ring gears and effective when engaged to prevent rotation of said second turbine and both of said pair of ring gears.

12. A power transmission comprising in combination, a hydrodynamic torque converter and planetary gearing system, said torque converter including an impeller driven by an engine drive shaft, first, second and third turbines and a reaction member adapted to successively receive circulating working fluid from said impeller, said gearing system including a planet carrier fixed to an output shaft and to said third turbine, first and second planet pinions journalled in said carrier in mesh with each other, a sun gear and a ring gear in mesh with said first planet pinion, a drive connection including a one-way clutch for connecting said sun gear to said first turbine, means for preventing reverse rotation of said ring gear and said torque converter reaction member and for premitting forward rotation thereof including a one-way brake and an engageable and releasable two-way brake connected in series, second and third ring gears in mesh with said second planet pinion, a drive connection between said second turbine and said second ring gear, an engageable and releasable two-way brake effective when engaged to prevent rotation of said second turbine and said second and third ring gears, and an engageable and releasable clutch effective when engaged to connect said output shaft directly to said input shaft.

13. A power transmission comprising in combination, a hydrodynamic torque converter and a planetary gearing system, said torque converter including an engine driven impeller, first, second and third turbines and a reaction member adapted to receive circulating working fluid successively from the impeller, said gearing system including a planet carrier fixed to an output shaft and to said third turbine, a first planet pinion journalled in said carrier in mesh with a sun gear and a reaction ring gear, one-way brake means for preventing reverse rotation of said reaction ring gear and for permitting forward rotation of the same, second and third pinion gears journalled in said carrier in mesh with each other, said second pinion gear being in mesh with said sun gear, said third pinion gear being in mesh with a second ring gear, a drive connection between said first turbine and said sun gear, and a drive connection between said second turbine and said second ring gear.

14. A power transmission comprising in combination, a hydrodynamic torque converter and a planetary gearing system, said torque converter including an impeller driven by an engine drive shaft, first, second and third turbines and a reaction member adapted to receive circulating working fluid successively from the impeller, said gearing system including a planet carrier fixed to an output shaft and to said third turbine, a first planet pinion journalled in said carrier in mesh with a sun gear and a reaction ring gear, one-way brake means for preventing reverse rotation of said converter reaction member and said reaction ring gear and for permitting forward rotation of the same, second and third pinion gears journalled in said carrier in mesh with each other, said second pinion gear being in mesh with said sun gear, a second ring gear in mesh with said third pinion gear, a drive connection between said first turbine and said sun gear including a one-way clutch, a drive connection between said second ring gear and said second turbine, and an engageable and releasable clutch effective when engaged to connect said engine drive shaft directly to said output shaft.

15. A power transmission comprising in combination, a hydrodynamic torque converter and a planetary gearing system, said torque converter including an engine driven impeller, first, second and third turbines and a reaction member adapted to receive circulating working fluid successively from the impeller, said gearing system including a planet carrier fixed to an output shaft and to said third turbine, a planet pinion gear journalled in said carrier in mesh with a sun gear and a reaction ring gear, one-way brake means for preventing reverse rotation of said reaction ring gear and for permitting forward rotation of the same, a drive connection between said first turbine and said sun gear, second and third intermeshing planet pinions journalled in said carrier, a reaction ring gear in mesh with said second planet pinion, an additional ring gear in mesh with said third planet pinion, means forming a drive connection between said second turbine and said additional ring gear, and one-way brake means for preventing reverse rotation of said second-mentioned reaction ring gear and for permitting forward rotation of the same.

16. In a power transmission in combination, a hydrodynamic torque converter and planetary gearing system, said torque converter including an engine driven impeller, first, second and third turbines and a reaction member adapted to successively receive circulating working fluid from said impeller, said gearing system including first and second planetary gearing units, said first planetary gearing unit including a planet carrier having first and second intermeshing planet pinions journalled thereon, a sun gear and a reaction ring gear in mesh with said first planet pinion, means including a one-way clutch forming a drive connection between said first turbine and said sun gear, means including an engageable and releasable two-way brake and a one-way brake connected in series for preventing reverse rotation of said turbine reaction member and said reaction ring gear and for permitting forward rotation thereof when said two-way brake is engaged, second and third ring gears in mesh with said second planet pinion, a drive connection between said second turbine and said second ring gear, an engageable and releasable two-way brake associated with said third ring gear effective when engaged to prevent rotation of said second and third ring gears and said second turbine to establish reverse drive of said carrier, a drive connection between said third turbine and said carrier, said second gear unit including a planet carrier fixed to an output shaft and having a planet pinion journalled in said carrier, a sun gear fixed to the planet carrier of said first gear unit in mesh with said second gear unit pinion, a reaction ring gear in mesh with said second gear unit planet pinion, engageable and releasable brake means associated with said last-mentioned ring gear effective when engaged to establish reduction drive in said second gear unit, and engageable and releasable clutch means effective when engaged to connect the planet carrier of said first gear unit directly to the planet carrier of the second gear unit.

17. In a power transmission in combination, a hydrodynamic torque converter and a planetary gearing system, said torque converter including an impeller driven by an engine driven drive shaft, first, second and third turbines and a reaction member adapted to successively receive circulating working fluid from said impeller, said gearing system including a first planetary gearing unit and a secondary planetary gearing unit, said first planetary gearing unit including a planet carrier, first and second intermeshing planet pinions journalled in said carrier, a sun gear and a reaction ring gear in mesh with said first planet pinion, a drive connection including a one-way clutch for connecting said first turbine to said sun gear, means for preventing reverse rotation of said converter reaction member and said reaction ring gear and for permitting forward rotation thereof including a one-way brake and an engageable and releasable two-way brake connected in series, second and third ring gears in mesh with said second planet pinion, a drive connection between said second turbine and said second ring gear, an engageable and releasable brake associated with said third ring gear and effective when engaged to prevent rotation of said third and second ring gears and said second turbine, a drive connection between said third turbine and said carrier, said second gear unit including a planet carrier fixed to an output shaft and having a pinion gear journalled in said carrier, a sun gear fixed to the carrier of the first gear unit in mesh with said second gear unit pinion gear, a reaction ring gear in mesh with said second gear unit pinion gear, an engageable and releasable brake for preventing rotation of said last-mentioned ring gear, an engageable and releasable clutch effective when engaged to clutch the carrier of the first gear unit directly to the carrier of the second gear unit, and an engageable and releasable clutch effective when engaged to clutch said engine driven drive shaft directly to said power output shaft.

18. A torque multiplying transmission comprising in combination, a hydrodynamic torque converter and a planetary gearing system, said torque converter including an engine driven impeller, first, second, and third turbines, and a reaction member, said planetary gearing system including a planet carrier fixed for rotation with said third turbine and comprising the power delivery member of the gearing system, a plurality of pinion gears rotatably supported upon said planet carrier in mesh with each other, a power input sun gear for said gearing system driven by said first turbine, a power input ring gear for said gearing system driven by said second turbine, a reaction ring gear for said gearing system, and means for preventing reverse rotation of said reaction ring gear and for permitting forward rotation of the same.

19. In a power transmission, a hydrodynamic torque converter having a radial outflow impeller adapted to circulate working fluid successively through a plurality of turbines including first and second axial flow turbines and a radial flow turbine, an axial flow reaction member disposed between said radial flow turbine and said impeller, a planetary gearing system including a planet carrier fixed for rotation as a unit with said radial flow turbine and rotatably supporting a plurality of pinion gears thereon in mesh with each other, said planet carrier constituting the power delivery element of said gearing system, a power input sun gear for said gearing system driven by said first axial flow turbine, a power input ring gear for said gearing system driven by said second axial flow turbine, a reaction ring gear for said gearing system, and means for preventing reverse rotation of said reaction ring gear and for permitting forward rotation thereof.

References Cited in the file of this patent
UNITED STATES PATENTS

| 2,532,897 | Dodge | Dec. 5, 1950 |
| 2,624,215 | McRae | Jan. 6, 1953 |
| 2,795,154 | Russell | June 11, 1957 |
| 2,797,594 | Grattan | July 2, 1957 |
| 2,861,476 | Russell | Nov. 25, 1958 |
| 2,885,908 | De Lorean | May 12, 1959 |
| 2,893,266 | Kelley | July 7, 1959 |

FOREIGN PATENTS

| 513,764 | Belgium | Sept. 15, 1952 |